(12) United States Patent
Sun

(10) Patent No.: US 11,330,394 B2
(45) Date of Patent: May 10, 2022

(54) EARLY WARNING METHOD AND DEVICE BASED ON WIFI SIGNAL STRENGTH DISTURBANCE, AND STORAGE MEDIUM

(71) Applicant: ZTE CORPORATION, Guangdong (CN)

(72) Inventor: Jiajia Sun, Guangdong (CN)

(73) Assignee: XI'AN ZHONGXING NEW SOFTWARE CO., LTD., Shaanxi (CN)

( * ) Notice: Subject to any disclaimer, the term of this patent is extended or adjusted under 35 U.S.C. 154(b) by 99 days.

(21) Appl. No.: 16/645,548

(22) PCT Filed: Sep. 7, 2018

(86) PCT No.: PCT/CN2018/104674
§ 371 (c)(1),
(2) Date: Mar. 9, 2020

(87) PCT Pub. No.: WO2019/047934
PCT Pub. Date: Mar. 14, 2019

(65) Prior Publication Data
US 2020/0267496 A1    Aug. 20, 2020

(30) Foreign Application Priority Data
Sep. 7, 2017    (CN) .......................... 201710799597.4

(51) Int. Cl.
*H04W 4/021* (2018.01)
*H04B 17/318* (2015.01)
*H04W 24/08* (2009.01)

(52) U.S. Cl.
CPC .......... *H04W 4/021* (2013.01); *H04B 17/318* (2015.01); *H04W 24/08* (2013.01)

(58) Field of Classification Search
CPC ..... H04W 4/021; H04W 24/08; H04W 24/04; H04B 17/318; H04B 17/336; H04L 5/00; H04L 5/0008
See application file for complete search history.

(56) References Cited

U.S. PATENT DOCUMENTS

| | | | |
|---|---|---|---|
| 9,113,344 B1 | 8/2015 | Lee | |
| 2014/0038540 A1* | 2/2014 | Yang | ...................... G01S 5/0252 455/226.1 |
| 2019/0175074 A1* | 6/2019 | Zhang | .................. H04B 17/336 |

FOREIGN PATENT DOCUMENTS

| | | |
|---|---|---|
| CN | 106304163 A | 1/2017 |
| CN | 106971474 A | 7/2017 |

OTHER PUBLICATIONS

Zhong et al., "Wi-fire: Device-free fire detection using WiFi networks", Jul. 31, 2017, IEEE. (Year: 2017).*

(Continued)

*Primary Examiner* — Peter P Chau
(74) *Attorney, Agent, or Firm* — Li & Cai Intellectual Property (USA) Office

(57) ABSTRACT

The present disclosure provides an early warning method and an early warning device based on WIFI signal strength disturbance, and a storage medium. The early warning method includes receiving and analyzing WIFI signals in a monitoring area in real time to obtain amplitude and phase of a current WIFI signal in the monitoring area; determining whether the amplitude and the phase of the current WIFI signal are disturbed according to a difference between the amplitude and the phase of the current WIFI signal and those of a previous WIFI signal; and sending out an early warning signal when it is determined that the amplitude and the phase of the current WIFI signal are disturbed.

5 Claims, 3 Drawing Sheets

```
┌─────────────────────────────────────────────────────────────┐
│   receive and analyze WIFI signals in a monitoring area     │  ── S101
│   in real time to obtain amplitude and phase of a current   │
│   WIFI signal in the monitoring area                        │
└─────────────────────────────────────────────────────────────┘
                              │
                              ▼
┌─────────────────────────────────────────────────────────────┐
│   determine whether the amplitude and the phase of the      │  ── S102
│   current WIFI signal are disturbed according to a          │
│   difference between the amplitude and the phase of the     │
│   current WIFI signal and those of a previous WIFI signal   │
└─────────────────────────────────────────────────────────────┘
                              │
                              ▼
┌─────────────────────────────────────────────────────────────┐
│   send out an early warning signal when it is determined    │  ── S103
│   that the amplitude and the phase of the current WIFI      │
│   signal are disturbed                                      │
└─────────────────────────────────────────────────────────────┘
```

(56) References Cited

OTHER PUBLICATIONS

WIPO, International Search Report dated Oct. 18, 2018.
Kun Qian, Chenshu Wu, Zheng Yang, Yunhao Liu, Zimu Zhou. "PADS: Passive Detection of Moving Targets with Dynamic Speed using PHY Layer Information," 2014 IEEE.

* cited by examiner

EARLY WARNING METHOD AND DEVICE BASED ON WIFI SIGNAL STRENGTH DISTURBANCE, AND STORAGE MEDIUM

CROSS-REFERENCE TO RELATED APPLICATION

This is a national Phase Application filed under 35 U. S. C. 371 as a national stage of PCT/CN2018/104674, filed on Sep. 7, 2018, and application claiming the priority of Chinese Patent Application No. 201710799597.4, filed on Sep. 7, 2017, the contents of which are incorporated herein in their entirety by reference.

TECHNICAL FIELD

The present disclosure relates to, but is not limited to, the field of mobile terminal technology.

BACKGROUND

Human body detection refers to a process of detecting whether there is an individual in a target area. Human body detection based on equipment has been widely applied, but it requires special hardware equipment, such as infrared sensors and cameras, resulting in high hardware cost.

The wide coverage of wireless local area networks makes it possible to implement human body detection based on infrastructures of the wireless local area networks, human body detection is achieved by capturing environmental changes according to abnormal fluctuation of signal strength RSSI (received signal strength indication) caused when an individual enters a monitoring area, and the received signal strength RSSI is an average of a plurality of received signals, and can be acquired by most existing wireless devices.

RSSI represents a relationship between attenuation and distance in a propagation process of electromagnetic waves. When a person enters a monitoring area, reflection or scattering of electromagnetic waves are caused, which will inevitably lead to a change in signal strength RSSI, so that a function of monitoring persons can be performed by monitoring the signal strength RSSI. Most existing equipment can acquire an RSSI value, but there are many disadvantages in the above method: firstly, the RSSI is mainly measured according to radio frequency (RF) signals, one RSSI value corresponds to one data packet which is a scalar, and the RSSI value is unstable and fluctuates with time; secondly, RSSI at each position may be different under the influence of multipath effect, which easily causes errors and leads to system misjudgment, the RSSI lacks frequency information capable of using the multipath effect, and the RSSI at different positions may be the same. Some improvements are provided, such as deploying sensors in an indoor target area, and utilizing the densely deployed sensor nodes to mitigate the effects of the multipath effect and fluctuation over time, but none of the improvements can completely overcome the unreliability of the RSSI monitoring method.

SUMMARY

According to an embodiment of the present disclosure, an early warning method based on wireless fidelity (WIFI) signal strength disturbance is provided, and includes: receiving and analyzing WIFI signals in a monitoring area in real time to obtain amplitude and phase of a current WIFI signal in the monitoring area; determining whether the amplitude and the phase of the current WIFI signal are disturbed according to a difference between the amplitude and the phase of the current WIFI signal and amplitude and phase of a previous WIFI signal; and sending out an early warning signal when it is determined that the amplitude and the phase of the current WIFI signal are disturbed.

According to an embodiment of the present disclosure, an early warning device based on WIFI signal strength disturbance is provided, and includes an analysis module configured to receive and analyze WIFI signals in a monitoring area in real time to obtain amplitude and phase of a current WIFI signal in the monitoring area; a determination module configured to determine whether the amplitude and the phase of the current WIFI signal are disturbed according to a difference between the amplitude and the phase of the current WIFI signal and amplitude and phase of a previous WIFI signal; and an early warning module configured to send out an early warning signal when it is determined that the amplitude and the phase of the current WIFI signal are disturbed.

According to an embodiment of the present disclosure, an early warning device is provided, and includes a processor and a memory which stores a computer program, and when the processor executes the computer program, the processor performs the early warning method based on WIFI signal strength disturbance of the present disclosure.

According to an embodiment of the present disclosure, a computer-readable storage medium having a computer program stored thereon is further provided, and when the computer program is executed by at least one processor, the at least one processor performs the early warning method based on WIFI signal strength disturbance of the present disclosure.

BRIEF DESCRIPTION OF THE DRAWINGS

The accompanying drawings are intended to provide a further understanding of the present disclosure and are incorporated in and constitute a part of the present disclosure. The exemplary embodiments of the present disclosure and illustration thereof are intended to explain the present disclosure but not to limit the present disclosure. In the drawings.

DETAILED DESCRIPTION

The embodiments of the present disclosure will be described in detail below with reference to the accompanying drawings, and it should be understood that the embodiments described below are merely for illustrating and explaining the present disclosure but are not intended to limit the present disclosure.

Figure 1:
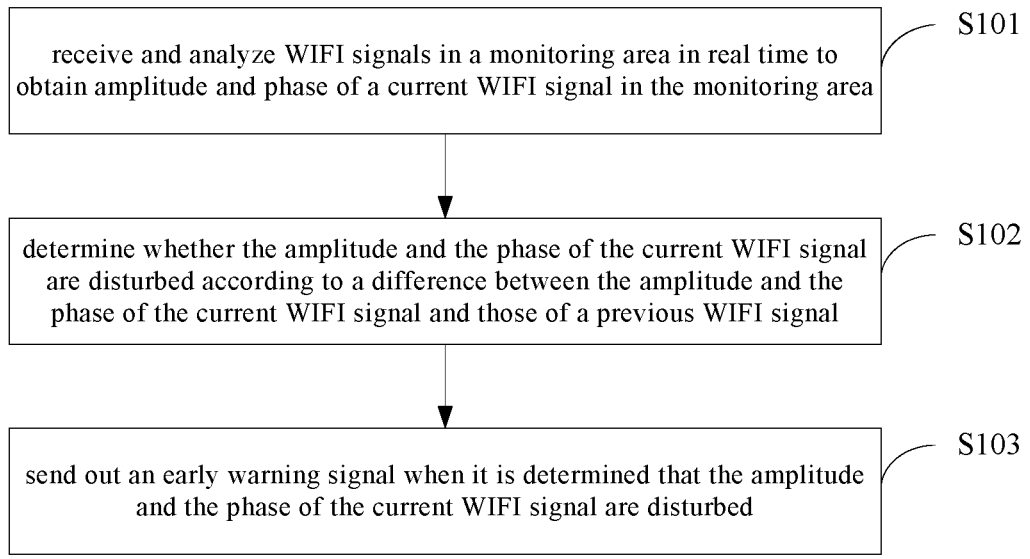
FIG. 1 is a flowchart illustrating an early warning method based on WIFI signal strength disturbance according to an embodiment of the present disclosure.

FIG. 1 is a flowchart illustrating an early warning method based on WIFI signal strength disturbance according to an embodiment of the present disclosure.

As shown in FIG. 1, an early warning method based on WIFI signal strength disturbance according to an embodiment of the present disclosure may include steps S101 to S103.

In step S101, WIFI signals in a monitoring area are received and analyzed in real time to obtain amplitude and phase of a current WIFI signal in the monitoring area.

In step S102, it is determined whether the amplitude and the phase of the current WIFI signal are disturbed according to a difference between the amplitude and the phase of the current WIFI signal and those of a previous WIFI signal.

In step S103, an early warning signal is sent out when it is determined that the amplitude and the phase of the current WIFI signal are disturbed.

The step S101 may include: receiving the WIFI signals transmitted through multipath channels in the monitoring area in real time to acquire the current WIFI signal in the monitoring area; and analyzing the acquired current WIFI signal to obtain the amplitude and the phase of the current WIFI signal in the monitoring area.

The step S102 may include: performing digital signal processing on the amplitude and the phase of the current WIFI signal to obtain two-dimensional eigenvalues of the amplitude and the phase of the current WIFI signal; and determining whether the amplitude and the phase of the current WIFI signal are disturbed according to the obtained two-dimensional eigenvalues of the amplitude and the phase of the current WIFI signal and two-dimensional eigenvalues of the amplitude and the phase of the previous WIFI signal.

According to the embodiments of the present disclosure, the step of determining whether the amplitude and the phase of the current WIFI signal are disturbed according to the obtained two-dimensional eigenvalues of the amplitude and the phase of the current WIFI signal and the two-dimensional eigenvalues of the amplitude and the phase of the previous WIFI signal may include: comparing the obtained two-dimensional eigenvalues of the amplitude and the phase of the current WIFI signal with the two-dimensional eigenvalues of the amplitude and the phase of the previous WIFI signal, and determining whether the two-dimensional eigenvalues of the amplitude and the phase of the current WIFI signal are the same as the two-dimensional eigenvalues of the amplitude and the phase of the previous WIFI signal; determining that the amplitude and the phase of the current WIFI signal are not disturbed if it is determined that the two-dimensional eigenvalues of the amplitude and the phase of the current WIFI signal are the same as the two-dimensional eigenvalues of the amplitude and the phase of the previous WIFI signal; and determining that the amplitude and the phase of the current WIFI signal are disturbed if it is determined that the two-dimensional eigenvalues of the amplitude and the phase of the current WIFI signal are different from the two-dimensional eigenvalues of the amplitude and the phase of the previous WIFI signal.

According to the embodiments of the present disclosure, the step of performing digital signal processing on the amplitude and the phase of the current WIFI signal to obtain the two-dimensional eigenvalues of the amplitude and the phase of the current WIFI signal may include: performing a first digital signal processing on the amplitude and the phase of the current WIFI signal to obtain an amplitude sequence, a phase sequence and covariance matrices of the current WIFI signal; and obtaining the two-dimensional eigenvalues of the amplitude and the phase of the current WIFI signal according to the obtained amplitude and phase sequences and the covariance matrices of the current WIFI signal.

Figure 2:
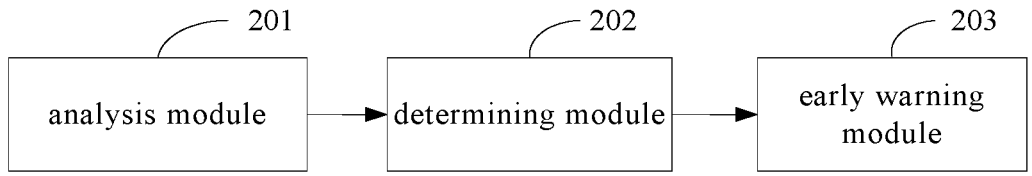
FIG. 2 is a schematic diagram of an early warning device based on WIFI signal strength disturbance according to an embodiment of the present disclosure.

FIG. 2 is a schematic diagram of an early warning device based on WIFI signal strength disturbance according to an embodiment of the present disclosure.

As shown in FIG. 2, an early warning device based on WIFI signal strength disturbance according to an embodiment of the present disclosure may include an analysis module 201, a determining module 202, and an early warning module 203. The analysis module 201 is configured to receive and analyze WIFI signals in a monitoring area in real time to obtain amplitude and phase of a current WIFI signal in the monitoring area. The determining module 202 is configured to determine whether the amplitude and the phase of the current WIFI signal are disturbed according to a difference between the amplitude and the phase of the current WIFI signal and amplitude and phase of a previous WIFI signal. The early warning module 203 is configured to send out an early warning signal when it is determined that the amplitude and the phase of the current WIFI signal are disturbed.

The analysis module 201 may include an acquisition unit and an analysis unit. The acquisition unit is configured to receive the WIFI signals transmitted through multipath channels in the monitoring area in real time to acquire the current WIFI signal in the monitoring area. The analysis unit is configured to analyze the acquired current WIFI signal to obtain the amplitude and the phase of the current WIFI signal in the monitoring area.

The determining module 202 may include a digital signal processing unit and a determining unit. The digital signal processing unit is configured to perform digital signal processing on the amplitude and the phase of the current WIFI signal to obtain two-dimensional eigenvalues of the amplitude and the phase of the current WIFI signal. The determining unit is configured to determine whether the amplitude and the phase of the current WIFI signal are disturbed according to the obtained two-dimensional eigenvalues of the amplitude and the phase of the current WIFI signal and two-dimensional eigenvalues of the amplitude and the phase of the previous WIFI signal.

According to the embodiments of the present disclosure, the determining unit may include a comparison sub-unit and a determination sub-unit. The comparison sub-unit is configured to compare the obtained two-dimensional eigenvalues of the amplitude and the phase of the current WIFI signal with the two-dimensional eigenvalues of the amplitude and the phase of the previous WIFI signal, and determine whether the two-dimensional eigenvalues of the amplitude and the phase of the current WIFI signal are the same as the two-dimensional eigenvalues of the amplitude and the phase of the previous WIFI signal. The determination sub-unit is configured to determine that the amplitude and the phase of the current WIFI signal are not disturbed when it is determined that the two-dimensional eigenvalues of the amplitude and the phase of the current WIFI signal are the same as the two-dimensional eigenvalues of the amplitude and the phase of the previous WIFI signal, and determine that the amplitude and the phase of the current WIFI signal are disturbed when it is determined that the two-dimensional eigenvalues of the amplitude and the phase of the current WIFI signal are different from the two-dimensional eigenvalues of the amplitude and the phase of the previous WIFI signal.

The digital signal processing unit may be configured to perform a first digital signal processing on the amplitude and the phase of the current WIFI signal to obtain an amplitude sequence, a phase sequence and covariance matrices of the current WIFI signal, and obtain the two-dimensional eigenvalues of the amplitude and the phase of the current WIFI signal according to the obtained amplitude and phase sequences and the covariance matrices of the current WIFI signal.

The WIFI devices in the embodiments of the present disclosure adopt orthogonal frequency division multiplexing (OFDM) technology, which transmits signals through a plurality of orthogonal sub-carriers.

OFDM is a multi-carrier transmission technology that an available spectrum is divided into a plurality of carriers, each of which is modulated with a low-rate data stream. OFDM can realize a high data transmission rate by dividing high-speed data information into a plurality of alternating and parallel bit streams, and separately modulating the bit streams to a plurality of separated sub-carriers, so that the channel spectrum is allocated to a plurality of independent non-selective frequency sub-channels, and transmitted between an access point (AP) and a wireless network adapter, thereby realizing high spectrum utilization.

Figure 3:
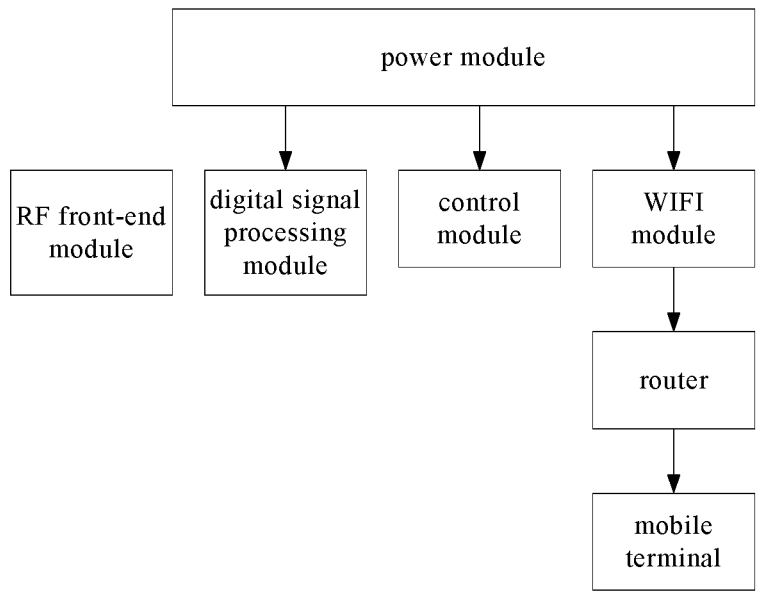
FIG. 3 is a schematic diagram of an early warning system based on WIFI signal strength disturbance according to an embodiment of the present disclosure.

FIG. 3 is a schematic diagram of an early warning system based on WIFI signal strength disturbance according to an embodiment of the present disclosure.

As shown in FIG. 3, an early warning system based on WIFI signal strength disturbance according to an embodiment of the present disclosure may include, but is not limited to, a radio frequency (RF) front-end module, a digital signal processing module, a power module, a control module and a WIFI module.

The power module supplies power to the digital signal processing module, the control module and the WIFI module. The control module determines whether to send an alarm instruction to a mobile terminal through WIFI.

The system works on a principle that a WIFI signal is sampled, analyzed and processed; two-dimensional eigenvalues of amplitude and phase of the signal are generated by the digital signal processing module and transmitted to a processor for making a determination; the control module generates an alarm instruction and transmits it to the mobile terminal through the WIFI module if it is detected that the eigenvalues change, that is, it is determined that a person enters a monitoring area and thus causes signal disturbance; and detection is continued if the eigenvalues do not change.

Figure 4:
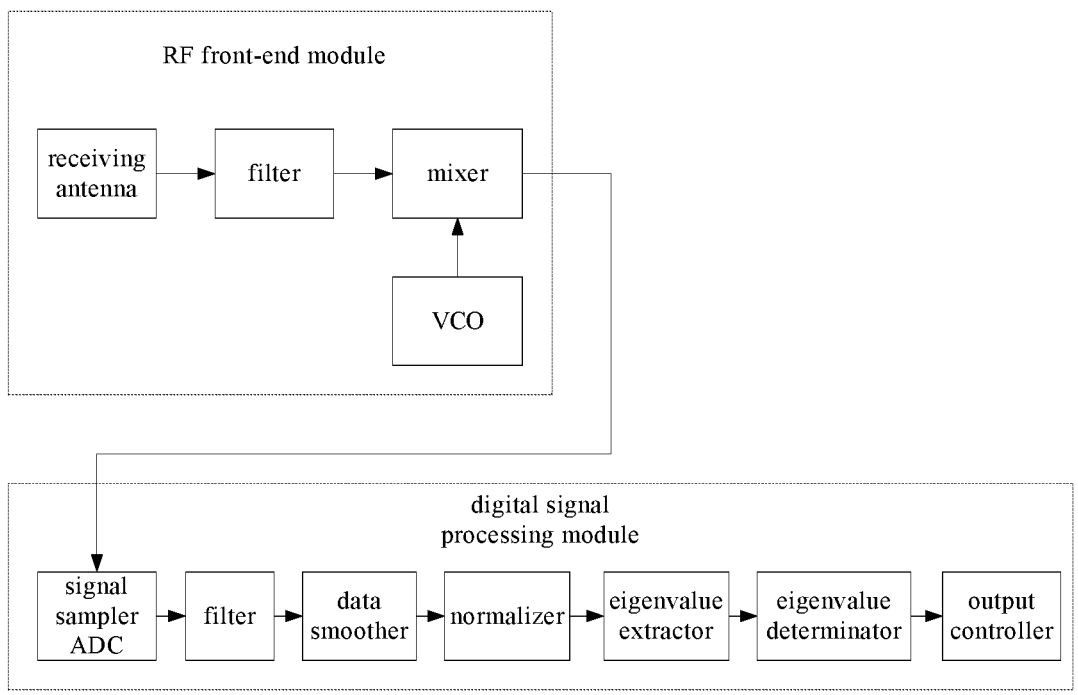
FIG. 4 is a structural diagram of a radio frequency front-end module and a digital signal processing module shown in FIG. 3.

FIG. 4 is a structural diagram of the RF front-end module and the digital signal processing module shown in FIG. 3.

As shown in FIG. 4, the RF front-end module includes a receiving antenna, a filter, a mixer, and a voltage controlled oscillator (VCO). After a WIFI signal is received by the receiving antenna, the WIFI signal enters the filter to filter out noise, and then is sent to the mixer to convert its frequency to a frequency suitable for being sampled by a sampler.

The receiving antenna may receive superposed signals after WIFI multipath transmission. The filter may filter Gaussian white noise out of band of the WIFI signal. The mixer can mix a local oscillator signal with the WIFI signal and perform frequency conversion to generate an input signal required by a digital signal processing circuit. The VCO may generate the local oscillator signal.

The digital signal processing circuit module is mainly configured to sample, analyze and process signals, and extract and determine eigenvalues. That is, when an analog signal which has been processed by the RF front-end module is sent to the digital signal processing circuit module for analysis, the signal is first sampled, outliers are filtered out by using an outlier filtering method, the remaining data is smoothed, and normalized to obtain an amplitude sequence and a phase sequence of the signal, and obtain corresponding covariance matrices respectively. Maximum eigenvalues of the amplitude covariance matrix and the phase covariance matrix are extracted to generate a binary eigenvalue group, and two-dimensional eigenvalues are transmitted to the control module for making a determination. Alarm information is sent to the mobile terminal through WIFI if it is detected that the eigenvalues change, otherwise the detection is continued.

The digital signal processing module includes a signal sampler, a filter, data smoother, normalizer, eigenvalue extractor, eigenvalue determinator, and output controller.

The signal sampler (ADC) samples a signal output by the RF front-end module without distortion; the filter identifies and detects outliers in a digital signal by using a Hampel filter algorithm, and filters and reconstructs the outliers; the data smoother is used to smooth the sampled data, so as to eliminate an influence of interference signals and improve smoothness of a digital signal sampling curve; the normalizer is used to normalize amplitude and phase of a signal, so as to facilitate the subsequent eigenvalue extraction and eigenvalue determination, and ensure acceleration in convergence speed when a program runs; the eigenvalue extractor is used to extract maximum eigenvalues of an amplitude covariance matrix and a phase covariance matrix to generate the binary eigenvalue group according to an amplitude sequence and a phase sequence of the signal, and corresponding covariance matrices which are obtained after normalization; the eigenvalue determinator is used to determine whether the eigenvalues change according to the extracted eigenvalues, and output a low level if the eigenvalues do not change, otherwise output a high level; and the output controller is used to send an alarm instruction to the mobile terminal through the WIFI module if the high level is detected, and keep monitoring to determine whether two-dimensional eigenvalues of amplitude and phase change if the low level is detected.

Figure 5:
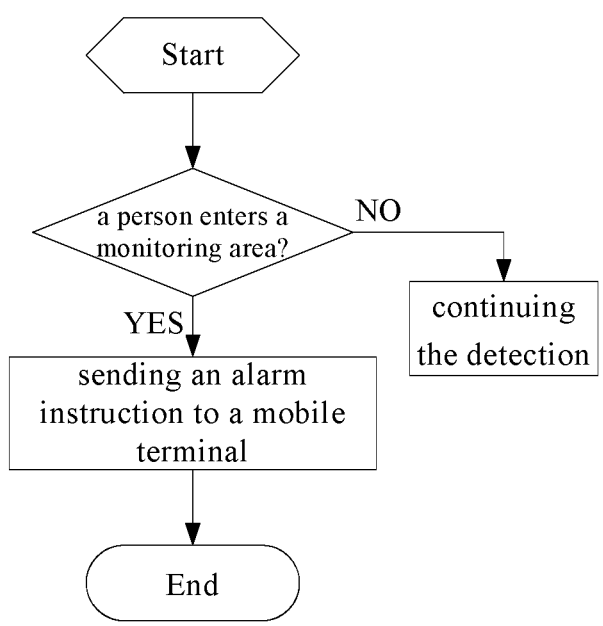
FIG. 5 is a flowchart illustrating an early warning method based on WIFI signal strength disturbance according to an embodiment of the present disclosure.

FIG. 5 is a flowchart illustrating an early warning method based on WIFI signal strength disturbance according to an embodiment of the present disclosure.

As shown in FIG. 5, when a person enters a monitoring area, reflection and scattering of a WIFI signal are caused to make the WIFI signal to deform, which results in a change in amplitude and phase of the WIFI signal. By determining whether a person enters a monitoring area according to a change in two-dimensional eigenvalues of signal amplitude and phase, accuracy and speed of early warning are improved.

In an OFDM system, a received signal after passing through multipath channels is represented as Y=HX+N, where Y and X denote a signal vector of a receiving end and a signal vector of a transmitting end respectively, and H and N denote a channel matrix and additive Gaussian white noise respectively. As the information of a physical layer for representing a channel gain from the transmitting end to the receiving end, H=Y/X after the noise is filtered out, H represents superposition of multipath channels, $H_i$ describes state information of each channel, and H is expressed as $$H=\Sigma_{i=0}^{n}H_i=\Sigma_{i=0}^{n}\|H_i\|e^{j\varnothing_i}$$

where $\|H_i\|$ represents an amplitude of a sub-carrier, $\varnothing_i$ represents a phase. A normalized amplitude sequence and a normalized phase sequence are represented by $\|\overline{H}\|$ and $\overline{\varnothing}$ respectively, the corresponding covariance matrices are $\Sigma(\|\overline{H}\|)$ and $\Sigma(\overline{\varnothing})$, and the maximum eigenvalues of the amplitude and phase covariance matrices are extracted respectively to generate the binary eigenvalue group F=[α, β], where α=max(eigen(∥H∥))), β=max(eigen(ρ(Ø))).

An eigenvalue is a reflection of each dimension of a signal space. Based on eigenvalue analysis, the present disclosure achieves monitoring whether a person enters a monitoring area and causes disturbance to a WIFI signal.

According to the technical solutions provided by the embodiments of the present disclosure, useful information of amplitude and phase of a WIFI signal is extracted by sampling, analyzing and processing the WIFI signal, and a change in space environment is represented by two-dimensional eigenvalues of the amplitude and the phase. When a person enters a monitoring area, it is inevitable that the WIFI signal deforms and a signal received by a receiving device changes. The processor determines whether a person enters the monitoring area according to a change in the two-dimensional eigenvalues of the amplitude and the phase output by a digital signal circuit, and generates an alarm instruction and sends it to a mobile terminal if it is detected that a person enters the monitoring area.

An early warning device is further provided according to the embodiments of the present disclosure, and includes a processor and a memory which stores a computer program, and when the processor executes the computer program, the processor performs the early warning method based on WIFI signal strength disturbance according to the embodiments of the present disclosure.

A computer-readable storage medium is further provided according to the embodiments of the present disclosure, and has a computer program stored thereon, and when the computer program is executed by at least one processor, the at least one processor performs the early warning method based on WIFI signal strength disturbance according to the embodiments of the present disclosure.

It should be understood by those skilled in the art that the functional modules/units in all or some of the steps, the systems, and the devices in the method disclosed above may be implemented as software, firmware, hardware, or suitable combinations thereof. If implemented as hardware, the division between the functional modules/units stated above is not necessarily corresponding to the division of physical components; for example, one physical component may have a plurality of functions, or one function or step may be performed through cooperation of several physical components. Some or all of the physical components may be implemented as software executed by a processor, such as a central processing unit, a digital signal processor, or a microprocessor, or may be implemented as hardware, or may be implemented as an integrated circuit, such as an application specific integrated circuit. Such software may be distributed on computer-readable media, which may include computer storage media (or non-transitory media). As well known by those skilled in the art, the term "computer storage media" includes volatile/nonvolatile and removable/non-removable media used in any method or technology for storing information (such as computer-readable instructions, data structures, program modules and other data). The computer storage media include, but are not limited to, RAMs, ROMs, EEPROMs, flash memories or other memory techniques, CD-ROMs, digital versatile disks (DVDs) or other optical discs, magnetic cassettes, magnetic tapes, magnetic disks or other magnetic storage devices, or any other media which can be used to store the desired information and can be accessed by a computer.

Although the present disclosure is described in detail above, the present disclosure is not limited thereto, and various modifications can be made by those skilled in the art according to the principles of the present disclosure. Any modification made in accordance with the principles of the present disclosure should be considered to fall within the scope of the present disclosure.

What is claimed is:

1. An early warning method based on wireless fidelity (WIFI) signal strength disturbance, comprising:
    receiving and analyzing WIFI signals in a monitoring area in real time to obtain amplitude and phase of a current WIFI signal in the monitoring area;
    determining whether or not the amplitude and the phase of the current WIFI signal are disturbed according to a difference between the amplitude and the phase of the current WIFI signal and amplitude and phase of a previous WIFI signal; and
    sending out an early warning signal in response that it is determined that the amplitude and the phase of the current WIFI signal are disturbed,
    wherein the step of receiving and analyzing the WIFI signals in the monitoring area in real time to obtain the amplitude and the phase of the current WIFI signal in the monitoring area comprises:
    receiving the WIFI signals transmitted through multipath channels in the monitoring area in real time to acquire the current WIFI signal in the monitoring area; and
    analyzing the acquired current WIFI signal to obtain the amplitude and the phase of the current WIFI signal in the monitoring area,
    wherein the step of determining whether or not the amplitude and the phase of the current WIFI signal are disturbed according to the difference between the amplitude and the phase of the current WIFI signal and the amplitude and the phase of the previous WIFI signal comprises:
    performing digital signal processing on the amplitude and the phase of the current WIFI signal to obtain two-dimensional eigenvalues of the amplitude and the phase of the current WIFI signal; and
    determining whether or not the amplitude and the phase of the current WIFI signal are disturbed according to the obtained two-dimensional eigenvalues of the amplitude and the phase of the current WIFI signal and two-dimensional eigenvalues of the amplitude and the phase of the previous WIFI signal.

2. The early warning method of claim 1, wherein the step of determining whether or not the amplitude and the phase of the current WIFI signal are disturbed according to the obtained two-dimensional eigenvalues of the amplitude and the phase of the current WIFI signal and the two-dimensional eigenvalues of the amplitude and the phase of the previous WIFI signal comprises:
    comparing the obtained two-dimensional eigenvalues of the amplitude and the phase of the current WIFI signal with the two-dimensional eigenvalues of the amplitude and the phase of the previous WIFI signal, and determining whether or not the two-dimensional eigenvalues of the amplitude and the phase of the current WIFI signal are the same as the two-dimensional eigenvalues of the amplitude and the phase of the previous WIFI signal;
    determining that the amplitude and the phase of the current WIFI signal are not disturbed in response that it is determined that the two-dimensional eigenvalues of the amplitude and the phase of the current WIFI signal are the same as the two-dimensional eigenvalues of the amplitude and the phase of the previous WIFI signal; and determining that the amplitude and the phase of the current WIFI signal are disturbed in response that it is determined that the two-dimensional eigenvalues of the amplitude and the phase of the current WIFI signal are different from the two-dimensional eigenvalues of the amplitude and the phase of the previous WIFI signal.

3. The early warning method of claim 1, wherein the step of performing the digital signal processing on the amplitude and the phase of the current WIFI signal to obtain the two-dimensional eigenvalues of the amplitude and the phase of the current WIFI signal comprises:

performing a first digital signal processing on the amplitude and the phase of the current WIFI signal to obtain an amplitude sequence, a phase sequence and covariance matrices of the current WIFI signal; and obtaining the two-dimensional eigenvalues of the amplitude and the phase of the current WIFI signal according to the obtained amplitude and phase sequences and the covariance matrices of the current WIFI signal.

4. An early warning device, comprising a processor and a memory, wherein the memory stores a computer program, and when the processor executes the computer program, the processor performs the early warning method based on WIFI signal strength disturbance of claim 1.

5. A non-transitory computer-readable storage medium having a computer program stored thereon, when the computer program is executed by at least one processor, the at least one processor performs the early warning method based on WIFI signal strength disturbance of claim 1.

* * * * *

UNITED STATES PATENT AND TRADEMARK OFFICE
CERTIFICATE OF CORRECTION

PATENT NO. : 11,330,394 B2
APPLICATION NO. : 16/645548
DATED : May 10, 2022
INVENTOR(S) : Jiajia Sun Page 1 of 1

It is certified that error appears in the above-identified patent and that said Letters Patent is hereby corrected as shown below:

In the Specification

Column 7, Line 2, the formula reading:

- where α=max (eigen($\|\bar{H}\|$))), β=max(eigen(ρ(Ø))). -

Should read:

-- where $\alpha=\max\left(\text{eigen}(\Sigma(\|\bar{H}\|))\right)$, $\beta=\max\left(\text{eigen}(\Sigma(\bar{\emptyset}))\right)$. --

Signed and Sealed this
Sixteenth Day of August, 2022

*Katherine Kelly Vidal*

Katherine Kelly Vidal
*Director of the United States Patent and Trademark Office*